(12) United States Patent  
Dalal et al.

(10) Patent No.: US 8,363,280 B2
(45) Date of Patent: Jan. 29, 2013

(54) SYSTEM AND METHOD OF HALFTONE PRINTING OF IMAGE SPOT COLORS USING RANKED ORDERED PAIRING OF COLORANTS AND HALFTONE SCREENS

(75) Inventors: Edul N. Dalal, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 720 days.

(21) Appl. No.: 12/536,046

(22) Filed: Aug. 5, 2009

(65) Prior Publication Data

US 2011/0032573 A1 Feb. 10, 2011

(51) Int. Cl.
*H04N 1/405* (2006.01)

(52) U.S. Cl. ........................... 358/3.06; 358/2.1
(58) Field of Classification Search .......... 358/1.9, 358/2.1, 3.03–3.09, 3.2–3.26, 468, 1.16

See application file for complete search history.

(56) References Cited

U.S. PATENT DOCUMENTS

| 4,196,451 | A | 4/1980 | Pellar |
| 5,745,250 | A | 4/1998 | Hains |
| 5,892,891 | A | 4/1999 | Dalal et al. |
| 6,226,103 | B1 | 5/2001 | Klassen et al. |
| 6,798,539 | B1 | 9/2004 | Wang et al. |
| 2004/0109184 | A1 | 6/2004 | Ishii |
| 2006/0077468 | A1 | 4/2006 | Loce et al. |
| 2008/0130054 | A1 | 6/2008 | Wang et al. |
| 2008/0130056 | A1 | 6/2008 | Wang et al. |

*Primary Examiner* — Thomas D Lee
*Assistant Examiner* — Stephen M Brinich
(74) *Attorney, Agent, or Firm* — Fay Sharpe LLP

(57) ABSTRACT

Systems and methods of halftoning an image for extended-colorant printing image spot colors are provided which perform a quality ranking of a plurality of periodic halftone screens to be used in halftoning the image and an objectionability ranking of the colorants used to produce the one or more image spot colors. Halftone screen-to-colorant assignments are then made using a ranked ordered pairing of the ranked screens and ranked colorants. The image is halftoned using these assignments and the results can be printed or saved for future printing. Pixel tags can be used to identify the ranked ordered halftone screen-to-colorant assignments.

19 Claims, 4 Drawing Sheets

FIG. 4 though the superposition of halftoned color separations for color printing using extended colorant sets can create interference patterns, known as moiré, which can be seen in the image, thus detracting from the visual appearance of the halftoned image. Each additional halftone screen required to render an image increases the likelihood of the generation of objectionable moiré.

SYSTEM AND METHOD OF HALFTONE PRINTING OF IMAGE SPOT COLORS USING RANKED ORDERED PAIRING OF COLORANTS AND HALFTONE SCREENS

BACKGROUND

The presently disclosed embodiments are directed toward methods and systems related to extended colorant printing and more particularly to optimally halftoning image spot colors rendered with extended colorant sets using ranked ordered pairing of halftone screens with colorants based on screen quality and colorant objectionability.

Digital halftoning is an important step in printing or displaying images possessing continuous color tones. Examples of such processes are used in most printing presses, ink jet printers, binary cathode ray tube (CRT) displays, and laser xerography. It is well understood that most digital color printers operate in a binary mode, i.e., for each color separation, a corresponding colorant spot is either printed or not printed at a specified image location or pixel. Digital color halftoning controls the printing of color spots formed by combinations of colorants of a colorant set, where the spatial averaging of the printed colorant spots, such as by the human visual system, provides the illusion of the required continuous color tones, also referred to as contones.

The most common halftone technique is screening, which compares the required continuous color tone level of each pixel for each color separation with one or more predetermined threshold levels. The predetermined threshold levels are typically defined for a cell that is tiled to fill the plane of an image, thereby forming a halftone screen of threshold values. At a given pixel, if the required color tone level is darker than the threshold halftone level, a colorant spot is printed at that specified pixel. Otherwise the colorant spot is not printed. The output of the screening process is a binary pattern of multiple small "dots", which are regularly spaced as determined by the size, shape, and tiling of the halftone cell. Conventional screening outputs can be considered as two-dimensional repeated patterns, possessing two fundamental spatial frequencies, which are completely defined by the geometry of the halftone screens.

As further refinement of color printing techniques continues, the move beyond the use of 3-color printing (using combinations of 3 colorants such as Cyan (C), Magenta (M), and Yellow (Y)) and 4-color printing (using 4 colorants such as C, M, Y and Black (K)) is rapidly expanding into printing with extended colorant sets which use 5, 6 or more colorants to increase achievable color gamut. These extra colorants are sometimes called "hi-fi", "high fidelity", or "extended gamut" colorants, examples of which can include orange, violet, red, green, and blue. Extended colorant sets can also be used in Phototone" printing to render images with smoother gradations, reduced texture and visual noise than is possible with using conventional colorants alone. Phototone colorants can include relatively low chroma colorants, such as light cyan and light magenta, used in addition to corresponding conventional or relatively higher chroma colorants, such as the conventional C, M, Y, K colorants. Phototone colorants can also include several levels of gray and dark yellow in these extended colorant sets.

A different halftone screen is typically used for each color separation corresponding to a respective colorant, and the complete halftoned image results from the superposition of all the halftoned color separations. However, the superposition of halftoned color separations for color printing using extended colorant sets can create interference patterns, known as moiré, which can be seen in the image, thus detracting from the visual appearance of the halftoned image. Each additional halftone screen required to render an image increases the likelihood of the generation of objectionable moiré.

Significant efforts have been undertaken to reduce the undesirable effects of moiré in color halftoning including the use of different halftone screens having different screen angles for particular color separations. Stochastic screens can be used to mitigate this, however, stochastic screens can lead to a noisy or grainy appearance that is inappropriate for the high quality applications typically associated with hypochromatic colorants. Accordingly, periodic clustered shape halftone screens such as, clustered dot or clustered line screens are preferred However, as indicated above, if periodic clustered screens are not selected carefully, the screens selected for each color separation may interact with one another to create objectionable moiré patterns. While solutions to the moire issue have been found for the conventional 4 colorants, efforts to find methods for halftoning 5, 6, or more colorants are ongoing. For example, U.S. Pat. No. 5,892,891 to Dalal et al. discusses using the same screen for a hi-fi colorant and its complementary colorant (e.g., cyan and orange). Those techniques are not applicable to hypocolorants. In "Halftone-Angle Combinations for N Color Separations", M. Coudray suggests using the same screen for a lightened colorant and a different conventional colorant (e.g., light magenta and conventional cyan). However, in at least some instances this suggested technique could lead to significant moiré and color shifts for small registration errors between color separations.

US Publication No. 20080130054 A1 to Wang, et al., also proposed a halftone configuration for moiré-free N-color printing, but extension to beyond 4-color (CMYK) requires higher frequencies than those used for the CMYK screens. As the printing industry advances to using higher frequencies (it is currently common to use frequencies ≈200 lpi) for the CMYK screens, the higher frequencies required for the additional screens will be very challenging to print reliably, since the higher frequencies can be very sensitive to marking process fluctuations.

What is needed is a periodic clustered-dot halftone screen configuration for conventional colorants and hypochromatic colorants that is stable and produces low noise prints in printing techniques such as xerography.

BRIEF DESCRIPTION

Systems and methods of halftoning an image for extended-colorant printing image spot colors are provided.

In one aspect, a method of halftoning an image by an image processor for extended-colorant printing is provided which includes performing a quality ranking of a plurality of periodic halftone screens within a given screen set to be used for halftoning an image having one or more spot colors giving the screen which generates the least amount of undesirable affects the highest quality ranking and the screen which generates the largest amount of undesirable affects the lowest quality ranking; ranking the objectionability of the colorants used to produce the one or more image spot colors for one or more objectionability factors relating to image quality defects; and creating halftone screen-to-colorant assignments using ranked ordered pairing of the ranked screens and ranked colorants, pairing the screen having the highest quality ranking with the colorant having the highest objectionability, pairing the screen having the next highest quality ranking with the colorant having the next highest objectionability, and continuing the pairing in order until the screen having the lowest quality ranking is paired with the colorant having the lowest objectionability.

In another aspect, an image processing system is provided for halftoning an image which includes one or more processors forming an image processor, the image processor performs a quality ranking of a plurality of periodic halftone screens within a given screen set to be used for halftoning an image having one or more spot colors giving the screen which generates the least amount of undesirable affects the highest quality ranking and the screen which generates the largest amount of undesirable affects the lowest quality ranking, ranking the objectionability of the colorants used to produce the one or more image spot colors for one or more objectionability factors relating to image quality defects, and creates halftone screen-to-colorant assignments using ranked ordered pairing of the ranked screens and ranked colorants, pairing the screen having the highest quality ranking with the colorant having the highest objectionability, pairing the screen having the next highest quality ranking with the colorant having the next highest objectionability, and continuing the pairing in order until the screen having the lowest quality ranking is paired with the colorant having the lowest objectionability.

DETAILED DESCRIPTION

Figure 1:
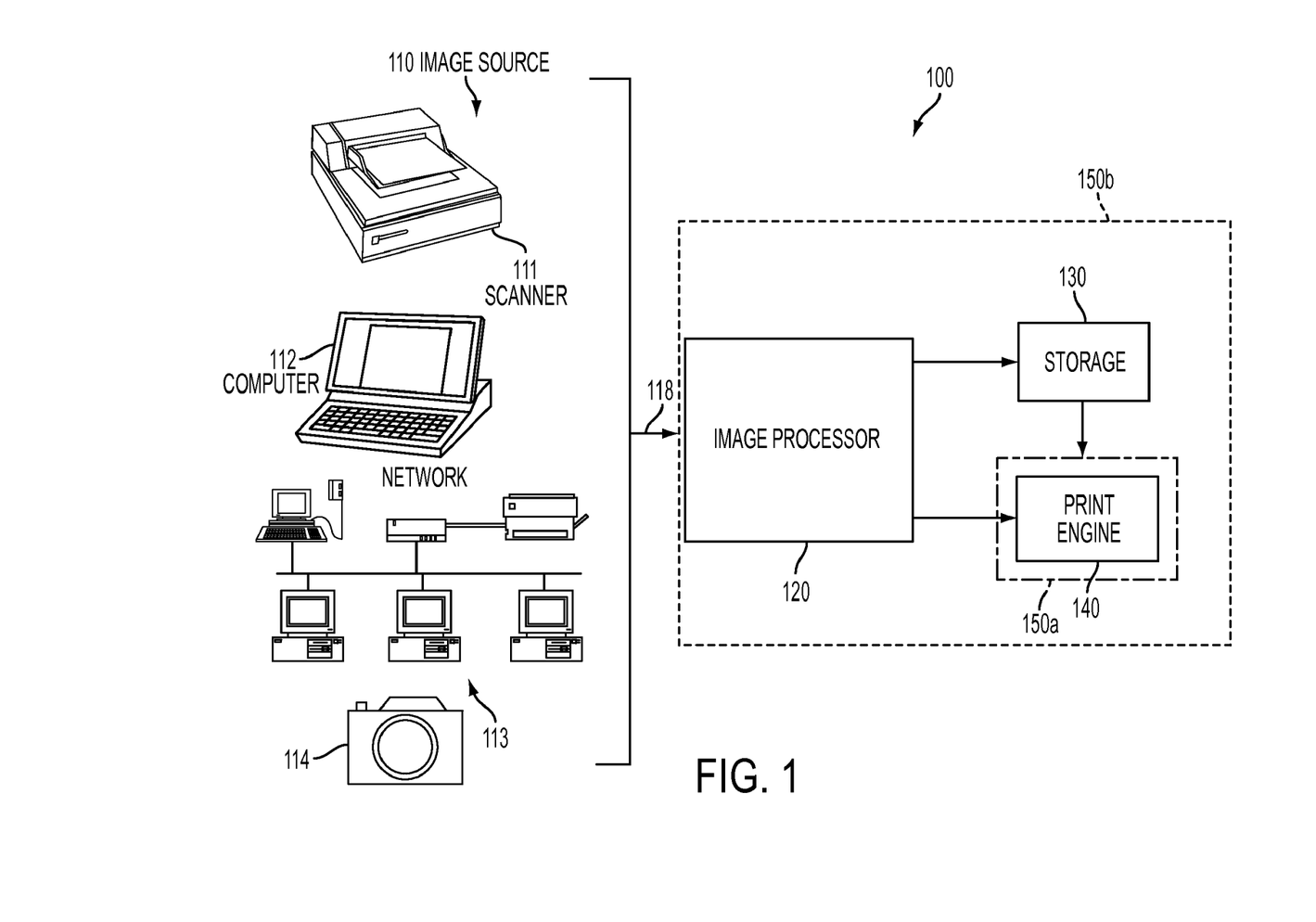
FIG. 1 is block diagram of an image processing system for generating a halftoned color image using ranked ordered pairing of halftone screens with colorants as described herein.

Referring now to FIG. 1, the systems and methods disclosed herein are directed towards aspects of an image processing system, shown generally at 100, creating halftone screen-to-image colorant assignments using ranked ordered pairing as described below. The teachings presented herein include systems and methods of halftoning images for extended-colorant printing as printed by print engine 140 of a digital printer 150a or 150b. Extended colorant printing uses more than 4 colorants and can utilize extended gamut colorant sets, using colorants such as violet, red, green, blue, or colorant sets with phototone colorants. Suitable extended colorant sets may also contain both extended gamut colorants and phototone colorants.

The image processing system 100 includes an image processor 120 performing ranked ordered pairings of periodic halftone screens with colorants, as described below, so that the most objectionable colorant is screened with the highest quality screen and the least objectionable colorant is screened with the lowest quality screen. Performing a ranked ordered pairing in this manner produces a halftoned image that is free of objectionable moiré, has low screen visibility, is stable and produces low noise prints when printed with print engines 140 from various printing technologies including xerography and ink jet.

The image processor 120 can be one or more microcontrollers, microprocessors, digital signal processors, central processing units (CPUs), graphical card CPUs, graphical processing units (GPUs), application specific integrated circuits (ASICs), field programmable gate arrays (FPGAs) and other processor computing devices utilizing applicable software for implementing these steps. In some embodiments, the image processor 120 is contemplated as being separate from the printer 150a, in other embodiments it can be incorporated in the printer 150b, and in other embodiments the image processing is distributed among image processors in the printer and image processors separate from the printer.

An image source 110 generates image data 118 for a digital image which includes one or more spot colors to be printed by print engine 140. Spot colors are typically used for printing an image object on a page. Note that the "spot" can extend to include most or all of a print, as in using the spot color for printing a background or a panel (or sheet) that can be used in combination with other panels, such as a side of a box in a package printing application. Examples of the image source 110 can include a scanner 111, computer 112, computer network 113, digital camera 114, or other image producing machine capable of generating the digital image data 118.

The image data 118 supplied to the image processor 120 by the image source 110, either directly or indirectly, can include image pixels having pixel values. In a digital image composed of data representing physical light, each element of data may be called a "pixel," which is common usage in the art and refers to a picture or image element. Each pixel has a location and value. Each pixel value is a bit in a "binary form" of an image, a gray scale value in a "gray scale form" of an image representing the gray level of the image pixel, such as for example a value failing in the range of 0 to 255 (though others can be used), or a set of color space coordinates in a "color coordinate form" of an image. These can be represented by two-dimensional arrays defining the image. Pixel tags associated with the pixels can also be used to provide meta data for use in rendering the image. These pixel tags can also be referred to as tag states, tag data, or tag values. The image data 118 includes information for determining which colorants will be used for printing the image spot colors.

It is well understood that most digital color printers operate in a binary mode, i.e., for each color separation, a corresponding colorant spot is either printed or not printed at a specified image location or pixel. As described above, digital color halftoning controls the printing of colorant spots for combinations of colorants of a colorant set, where the spatial averaging of the printed colorant spots, such as by the human visual system, provides the illusion of the required continuous color tones, also referred to as contones. The present systems and methods apply to the processing of color images, wherein each separation is treated, effectively, as a gray scale or continuous tone image for a corresponding colorant in the extended colorant set. Accordingly, references made herein to the processing of continuous tone (contone), or gray scale, images is intended to refer to the processing of image color separations.

The image processor 120 uses one or more halftone screen sets for halftoning the image which can be supplied to it or which it generates. The halftone screens can be stored as arrays of threshold values, along with 3 parameters—width, height of the array, and an offset of successive rows of the array, as taught by U.S. Pat. No. 6,226,103 for "Method of producing spot colors appearance with process color printing" to Klassen, et al., which is hereby incorporated herein by reference in its entirety. The halftone screens can be specified in other common formats, such as using angles and frequencies along with a threshold condition or function (often called a "spot function"), as taught by U.S. Pat. No. 4,196,451 for "Electronic Halftone Generator" to Pellar, which is hereby incorporated herein by reference in its entirety.

The image processor 120 performs the ranked ordered pairing of halftone screens with colorants, halftones the image using these screen-to-colorant assignments and outputs the results which can be printed by print engine 140 or stored by a storage device 130 for subsequent printing. Examples of the storage device 130 can include one or more of a computer memory, such as random access memory (RAM) or storage media, such as, magnetic media including, but not limited to, magnetic tapes and discs and optical media such as CD ROM, etc. Furthermore, the storage device 130 may include a computer network for transmitting output from the image processor 120 to another processor, image processing system or rendering device. The printing device 140 can include a print engine such as ink jet print engines, xerographic print engines and electrophotographic print engines.

Figure 2:
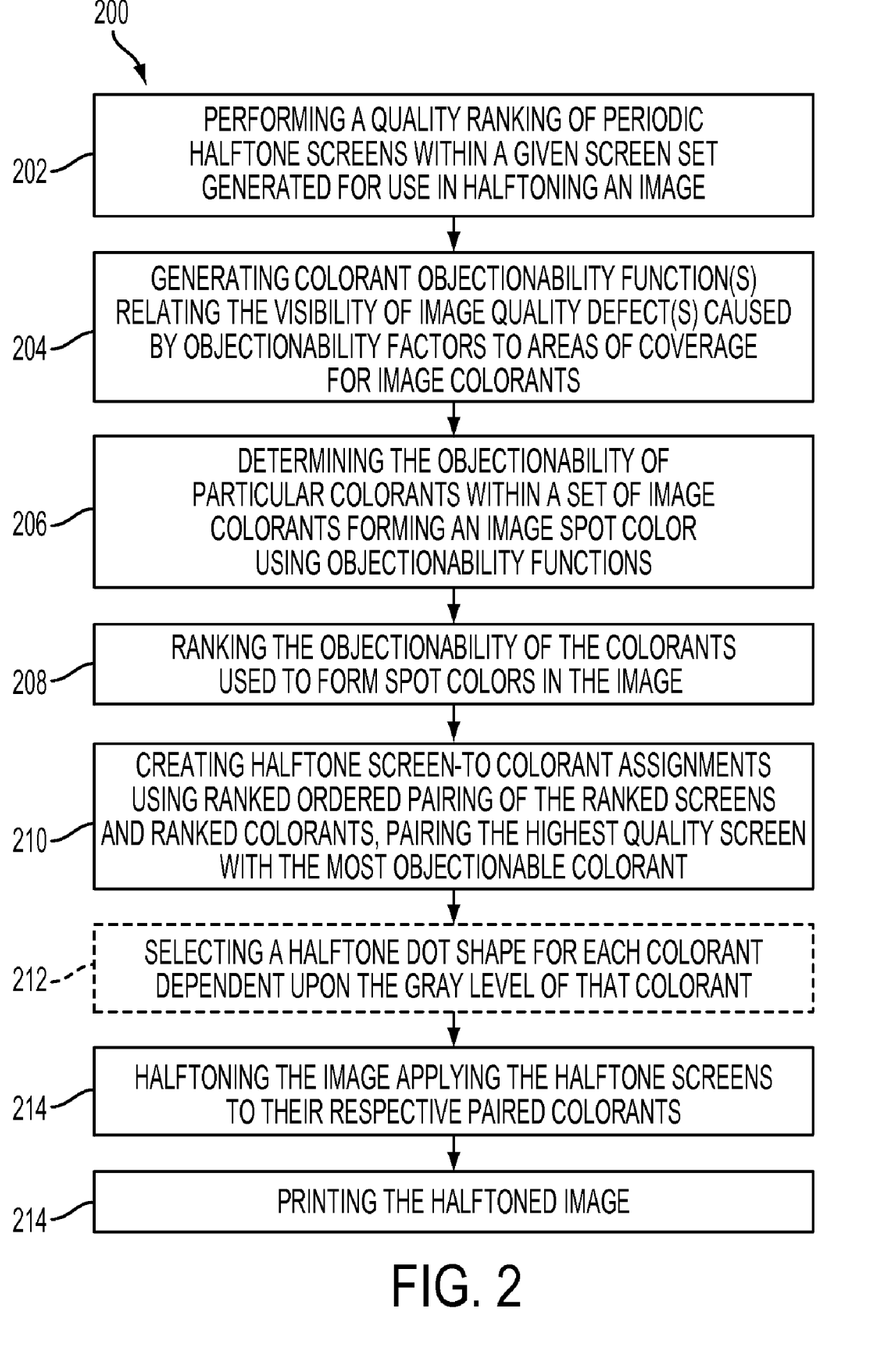
FIG. 2 is a flow chart illustrating a method of generating a halftoned color image using ranked ordered pairing of halftone screens with colorants as described herein.

Referring now to FIG. 2, a method shown generally at 200 of rendering a digital image including halftoning with an extended colorant set using ranked ordered pairing. The method 200 includes the processor 120 performing a quality ranking at 202 of a plurality of available periodic halftone screens within a given screen set to be used for a halftoning an image. The screen set can include periodic clustered dot, or periodic clustered line screens for halftoning the image. Also, it should be appreciated that multiple screen sets can be use to produce the halftoned image, each set having a number of screens corresponding to the number of colorants used to produce a given image spot color. Some screen sets may use fewer screens corresponding to less than all of the colorants used to print the entire image.

The quality ranking includes determining which screen in the screen set generates the least amount of undesirable affects when used in halftoning the image. The screen which does this is determined to have the highest preference and thus it receives the highest quality ranking. The screen determined to have the lowest preference in the screen set is the screen which generates the largest amount of undesirable affects in halftoning the image. This screen receives the lowest quality ranking. The quality ranking is performed for each screen in the screen set.

Typically, a set of 3 or 4 halftone screens can be designed within a given frequency range which can be free of objectionable moire. Within the set, there are usually some screens that achieve better perceived image quality than others. The quality ranking of the screens in a given set is performed using one or more screen quality factors. It is contemplated different weights can be given to the different screen quality factors, when using more than one of them to perform the screen quality ranking at 202.

One screen quality factor is screen angle. It can affect the visibility of the screen in the halftoned image. A classical four screen set at frequency fHT, includes screens oriented at 45°, 15°, 75°, and a fourth screen at a slightly higher frequency at 0°. From a perspective of sensitivity of the human visual system, the 45° is the most preferred because it is the least visible, the 15° and 75° screens have equal visibility and therefore equal preference and ranking for this screen quality factor, and the 0° screen has the most visibility and therefore is the least preferred having the lowest ranking for this screen quality factor. Different screen angles can also produce varying amounts of mottle, banding or other image quality defects in the printed image, and its affect on these types of defects can also be taken into account when using screen angle as a screen quality factor.

The different halftone screens in the set can also have different frequencies, and screen frequency can be another screen quality factor. Lower frequency screens tend to be more visible. Therefore, the halftone screens can be given quality rankings proportional to their screen frequency, with the screen having the highest screen frequency being giving the highest quality ranking down to the screen having the lowest screen frequency being given the lowest quality ranking. Different screen frequencies can also produce varying amounts of mottle, banding or other image quality defects in the printed image, and its affect on these types of defects can also be taken into account when using screen frequency as a screen quality factor.

Sometimes the halftone screen set can include different types of screens, such as for example line screens and dot screens, among others. For example, screen type can affect screen visibility, wherein a given screen frequency, dot screens seem to be less visible and therefore less objectionable than line screens. Different screen types can also produce varying amounts of mottle, banding or other image quality defects in the printed image, and its affect on these types of defects can also be taken into account when using screen type as a screen quality factor.

It has been found that screen quality can also have a dependence on the particular print engine 140 to be used to print the halftoned image, and therefore screen quality ranking 202 can be performed using printer-dependent screen quality factors. For instance, some digital printers tend to print with slightly less mottle for screens at one or more angles, such as for example 0°, making those one or more screen angles having less angle-induced mottle highly preferable and thus those screens will be given a higher quality ranking. On the other hand, screens with a 0° fundamental frequency, or harmonic, can be sensitive to, or have an increased likelihood of creating banding on particular printers. Thus, and thus screen angle-induced banding as it relates to the intended print engine 140 can be used as another screen quality factor. It is therefore contemplated that different screen quality factors can have different weights which can vary in dependence on the particular print engine to be used.

The method 200 further includes generating objectionability functions for colorants at 204. Colorants each have some measure of "objectionability" representing the visibility or severity of an image quality defect associated with one or more objectionability factors. Objectionability can vary with changes in the colorant gray level, also referred to as the digital area coverage (DAC). This relationship produces an Objectionability vs. DAC function, or curve, for each colorant which can be referred to as the colorant's objectionability for the objectionability factor. A colorant's objectionability can be a unitless value.

The objectionability of multiple colorants can be represented together for a particular objectionability factor in an objectionability function. For example, referring to FIG. 3, an objectionability function of six colorants (cyan (C), magenta (M), yellow (Y), black (K), orange (O) and violet (V)) for the objectionability factor mottle is shown at 300. The objectionability 300 of these colorants (CMYKOV) for mottle has a parabolic dependence, or curve, as a function of their DAC. For instance, each colorant has zero objectionability at 0% and 100% area coverage for mottle, and a peak objectionability value in the colorants' mid tones. Objectionability function curves tend to roughly scale with the solid area density (or darkness) of the colorant for a given print engine. For instance, the mottle curve for cyan is roughly ½ the amplitude of the mottle curve for black.

Figure 3:
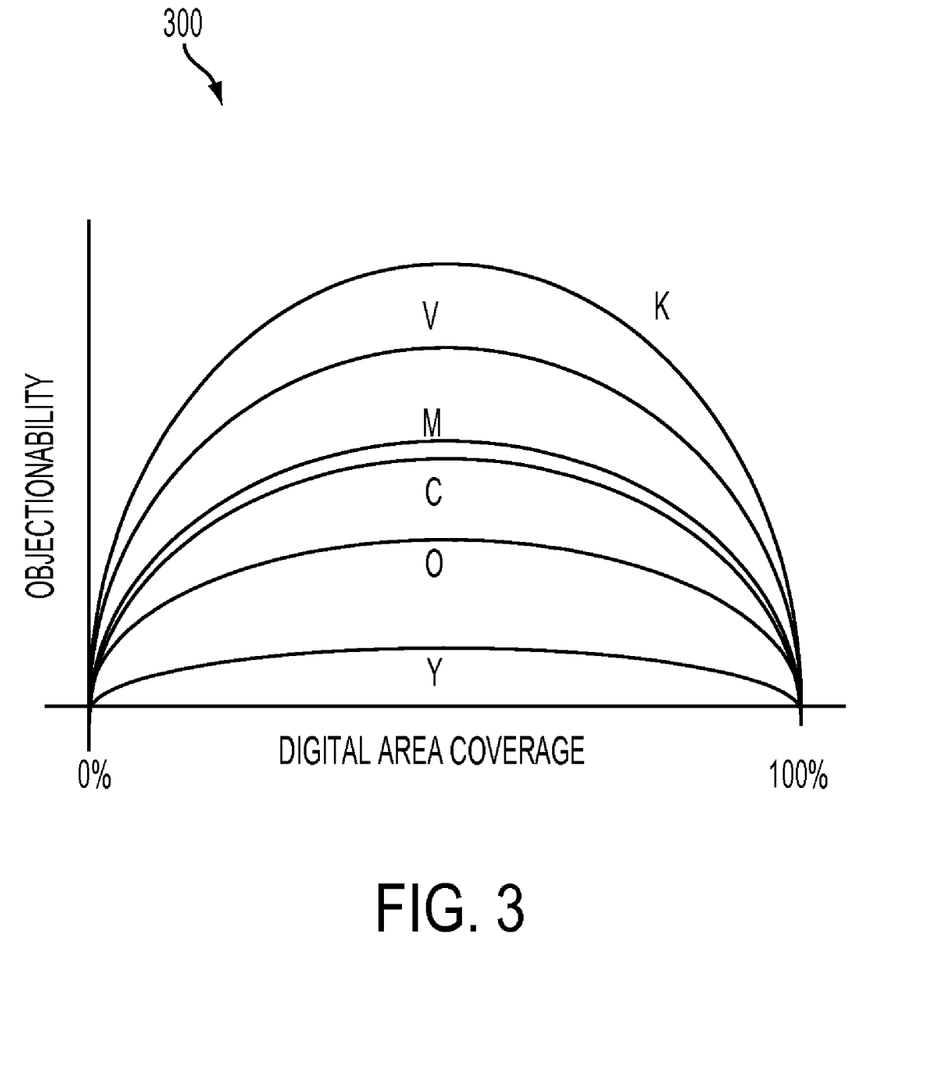
FIG. 3 illustrates an objectionability function of an objectionability factor for a plurality of colorants.

Examples of image quality defects which can be used as objectionability factors can include mottle, graininess, streaks, banding, and halftone screen visibility (presented as a measure of spatial nonuniformity). In a similar manner as with the mottle objectionability 300, it has been found that the objectionability of each of these objectionability factors tends to have a parabolic dependence as a function of digital area coverage, for a given colorant.

A more comprehensive curve can include the objectionability of more than one objectionability factor for the DAC of one or more colorants. For example, an objectionability curve can be constructed from weighted combinations of individual image defect objectionability factors, such as mottle and banding, etc., for a given colorant or colorants.

Since, in practice, objectionability curves tend to roughly scale with the solid area density of the colorant, this approximate relationship enables the objectionability curve construction to be simplified, using a functional relationship. Let $\Delta L$ be the solid area lightness relative to paper of a colorant and let DAC be the digital area coverage, scaled to [0, 1]. One exemplary form of the relative objectionability of an objectionability factor for a colorant may be described as:

$$\text{Objectionability} = \Delta L(DAC^2 - DAC) \quad (1)$$

Figure 4:
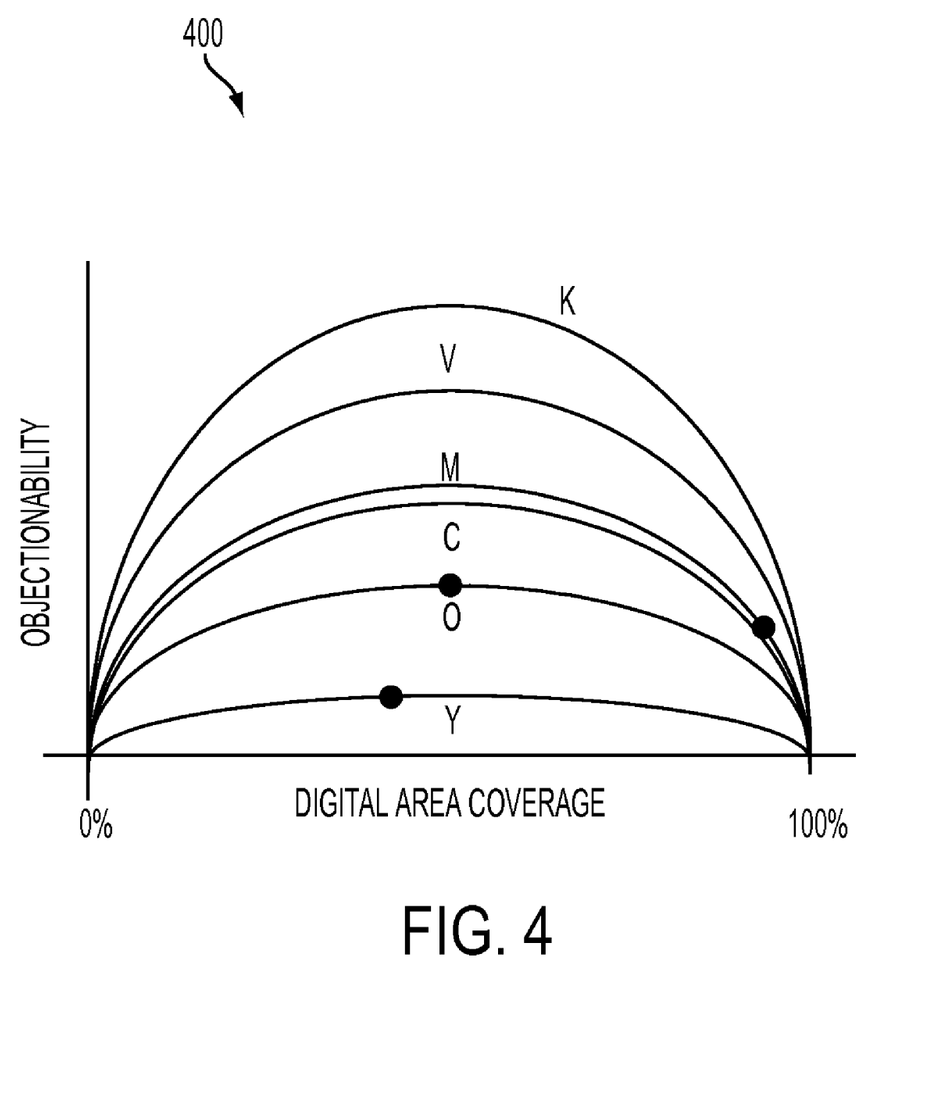
FIG. 4 illustrates an example of an objectionability function for a particular tint of an image spot color containing colorants Yellow, Orange, and Magenta.

Next, the objectionability functions are used for determining the objectionability of particular colorants within a set of image colorants forming an image spot color at 206. For a given spot color as described by image data, colorants within the set used to form the color will each have a solid area lightness relative to paper ($\Delta L$) and a DAC. Those values can be used to determine the objectionability of each colorant within the set for that spot color (color combination). Consider the example, shown in FIG. 4, illustrating the objectionability of a particular tint of red forming a spot color in the digital image having colorant DACs of M@90%, O@50%, Y@40% as indicated by the dots in the objectionability function 400. The objectionability of this colorant set, as measured along the ordinate, is then ranked at 208, either from high to low as O, M, Y or from low to high as Y, M, O.

There are several potential methods for generating objectionability curves at 204. In one embodiment, the objectionability can be pre-determined and sent to the processor creating the ranked ordered screen-to-colorant assignments. Using an imported curve which is defined for a particular marking process, which may include for example, data describing mottle for each colorant for a particular print engine 140, can be very useful, while being easy to construct. Alternatively, the objectionability parameters used for determining objectionability can be sent to the processor 120 which can be used in a stored function, or rule, for calculating objectionability.

The method 200 further includes creating halftone screen-to-image colorant assignments using ranked ordered pairing of the ranked screens and ranked colorants at 210, where the highest quality screen determined at 202 is paired with the most objectionable colorant, which is the colorant having the highest objectionability as determined at 208. The ordered pairing 210 is continued, pairing the next highest quality screen at determined at 202 with the second most objectionable colorant as determined at 208, etc., until the lowest quality screen is paired with the least objectionable colorant, which is the colorant having the lowest objectionability as determined at 208.

Pixel tags can be used to communicate to the processor responsible for performing the halftoning, as described below, the screen-to-colorant assignments made at 210 for the image on a pixel-by-pixel basis for each pixel color value. Thus, the ranked ordered pairing can be performed offline from a print job, in an image processor 120 which can be separate from the printing device 150a. At print time, the pixel tags or the colorant levels can used to access the stored halftones for printing the image.

The method can 200 further include an optional step 212 of selecting a halftone dot shape for each colorant dependent upon the gray level of that colorant used in forming the spot color. A property of conventional threshold-based halftoning is that the halftone dot grows monotonically to produce increasingly darker gray levels when moving from image highlights, to image mid-tones, to image shadows. Monotonic growth of halftone dots, as used herein, means that each larger dot used to produce a darker gray level in a halftoned image contains the same pixels that were already "turned on" to produce the smaller dots used to produce lighter gray levels. With conventional monotonic halftone dot growth, once a bit is turned on it stays on for the remainder of the dot growth to the darker gray levels.

This monotonic characteristic is good for pictorial halftoning since each level is related to the others and there can be a smooth progression across a gray-scale gradation in the pictorial image with minimal visual contouring. Because of the need for the levels to be related and because of the monotonic growth, some of the individual levels are not of an optimal shape. That is, the patterns of some dots are not symmetric, and some can have noise-inducing pixel appendages that in large flat image areas can give rise to xerographic defects or other undesirable visual artifacts. The overall design of the dot shape is a compromise in a conventional halftoning system.

Tint dots, on the other hand, are specifically designed to stand alone. In particular, the patterns avoid as much as possible the usual checkerboard 50% level pattern where halftone dots touch each other, which a xerographic or ink jet printer may not print consistently. In addition, dots that are more rounded are less noisy than dots with appendages. Therefore, the pattern at each gray level of a tint dot is separately optimized to be noise-free and symmetric. In particular, there is no point or level at which the dots touch. The dots are circular spots from the highlights through the mid-tones, and at some point the patterns become inverted and the shadows are circular white holes which become increasingly smaller with darker shadows. The dot growth is not necessarily monotonic. A pixel that is turned on for one level may be turned back off for a larger level. Tint dots are usually used to improve the quality of synthetic graphics, business graphics and spot colors, and have a cleaner appearance in large flat areas.

Threshold arrays can be used as an efficient means for producing tint dots, as taught by U.S. Pat. No. 5,745,250 for Method of Producing Tint Dots with Pairs of Holladay Halftones" to C. Hains, which is hereby incorporated herein by reference in its entirety. Based on the gray level of a given colorant of the spot color, a round dot threshold array or a round hole threshold array will be chosen to perform the halftoning for that colorant Pixel tags can be used to identify the selected dot shape to be used for each pixel for the halftoning step.

The image can then be halftoned at 214 by applying each halftone screen to its corresponding colorant as determined by the ranked ordered pairing 210 described above. It will be appreciated by those skilled in the art that the rendering of the image into a printable or displayable output format may be accomplished at any of a number of locations. The halftoned image can then be printed at 216, or stored for later use. As mentioned, pixel tags can be used for selecting the halftone screen threshold array to be applied to the given colorants for the image object. The number of pixel tag states providing this information can be limited to comply with the design parameters of the image processor 120, the print engine 140, or both, if so desired. As an example, the number of tag states can be limited to 4 bits, though examples may be contemplated.

The ranked ordered paring of halftone screen-to-colorants as described herein results in the colorant having the most visible objectionability being paired with, and thus be screened with, the highest quality screen, the second most objectionable colorant will be screened with the second highest quality screen, and so on. For the example of FIG. 4 above, O would get the highest quality screen as determined at 202, M the second, and Y the third. This is a markedly different combination compared to conventional practices for extended colorant printing, which typically would have K halftoned with the highest quality screen, C and M with the next best screens, and Y halftoned with a screen that is suboptimal, such as using a high frequency or stochastic screen, thereby reserving two of the best screens for colorants that are not even used in forming this spot color.

It should be appreciated that the image to be halftoned can include a plurality of spot colors, each formed with a corresponding halftone screen set and a corresponding set of colorants. Therefore, the steps of performing the quality ranking of the plurality of periodic halftone screens, ranking the objectionability of the colorants used to produce the image spot color and creating the halftone screen-to-colorant assignments can be done for each spot color separately to produce the optimum halftoned image.

Where conventional systems and method of halftoning with extended colorant sets focused on process colors, the systems and methods described herein are particularly well suited for spot colors, where a tag state indicating an optimal halftone can be applied to all pixels in an image object within a digital image. That distinction allows for better optimization of dot shape, does not need to comprehend screen angle switching within a picture, and introduces a tag correspondence between spot color and halftone.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of halftoning an image by an image processor for extended-colorant printing comprising:
   performing a quality ranking of a plurality of periodic halftone screens within a given screen set to be used for halftoning an image spot color, giving the screen which generates the least amount of undesirable effects the highest quality ranking and the screen which generates the largest amount of undesirable effects the lowest quality ranking;
   ranking the objectionability of the colorants used to produce the image spot color for one or more objectionability factors relating to image quality defects;
   creating halftone screen-to-colorant assignments using ranked ordered pairing of the ranked screens and ranked colorants, pairing the screen having the highest quality ranking with the colorant having the highest objectionability, pairing the screen having the next highest quality ranking with the colorant having the next highest objectionability, and continuing the pairing in order until the screen having the lowest quality ranking is paired with the colorant having the lowest objectionability; and
   halftoning the image applying the halftone screens to their respective paired colorants.

2. The method of claim 1 further comprising using the pixel tags to indicate the screen-to-colorant assignments.

3. The method of claim 1 wherein the ranking objectionability of the colorants further comprises:
   generating an objectionability function relating the severity of an image quality defect associated with an objectionability factor to the area of coverage of one or more of the colorants; and
   determining the objectionability of colorants within a set of image colorants used in forming the image spot colors using the objectionability function.

4. The method of claim 3 wherein the objectionability factor is at least one of moffle, graininess, streaks, banding, and halftone screen visibility.

5. The method of claim 3 wherein objectionability=$\Delta L$ ($DAC^2 - DAC$), where $\Delta L$ is solid area lightness relative to paper of a colorant and DAC is digital area coverage of the colorant scaled to [0, 1].

6. The method of claim 1 wherein the performing the quality ranking of the screens uses one or more screen quality factors including at least one of screen angle, screen frequency, and screen type.

7. The method of claim 1 further comprising printing the halftoned image using a colorant set including phototone colorants.

8. The method of claim 1 further comprising selecting a halftone dot shape for each colorant dependent upon the gray level of that colorant used in forming the spot color.

9. The method of claim 8 wherein the halftone dots are image tint dots and further comprising producing the tint dots by halftoning with threshold arrays, and choosing the threshold arrays to be either round dot threshold arrays or round hole threshold arrays based on the gray level of the colorant to be used in printing the spot color.

10. The method of claim 8 further comprising using pixel tags to identify the selected dot shape to be used for each pixel.

11. The method of claim 1 wherein the image to be halftoned includes a plurality of spot colors and the performing, ranking and creating are done for each spot color separately.

12. An image processing system for halftoning an image comprising: one or more processors forming an image processor, the image processor performs a quality ranking of a plurality of periodic halftone screens within a given screen set to be used for halftoning an image spot color giving the screen which generates the least amount of undesirable affects the highest quality ranking and the screen which generates the largest amount of undesirable affects the lowest quality ranking, ranks the objectionability of the colorants used to produce the image spot color for one or more objectionability factors relating to image quality defects, and creates halftone screen-to-colorant assignments using ranked ordered pairing of the ranked screens and ranked colorants, pairing the screen having the highest quality ranking with the colorant having the highest objectionability, pairing the screen having the next highest quality ranking with the colorant having the next highest objectionability, and continues the pairing in order until the screen having the lowest quality ranking is paired with the colorant having the lowest objectionability.

13. The image processing system of claim 12, wherein the image processor uses pixel tags to indicate the screen-to-colorant assignments.

14. The image processing system of claim 12, further comprising a processor halftoning the image applying the halftone screens to their respective paired colorants.

15. The image processing system of claim 12, wherein image processor ranks the objectionability of the colorants by generating an objectionability function relating the severity of an image quality defect associated with an objectionability factor to the area of coverage of one or more of the colorants, determines the objectionability of colorants within a set of image colorants used in forming the image spot color using the objectionability function.

16. The image processing system of claim 15, wherein the objectionability factor is at least one of mottle, graininess, streaks, banding, and halftone screen visibility.

17. The image processing system of claim 16 wherein objectionability=$\Delta L(DAC^2-DAC)$, where $\Delta L$ is solid area lightness relative to paper of a colorant and DAC is digital area coverage of the colorant scaled to [0, 1].

18. The image processing system of claim 16 wherein the image processor performs the quality ranking of the screens using one or more screen quality factors including at least one of screen angle, screen frequency, and screen type.

19. A digital printer for printing images having one or more image spot colors using extended colorant sets comprising:

one or more processors forming an image processor, the image processor performing a quality ranking of a plurality of periodic halftone screens within a given screen set to be used for halftoning an image spot color giving the screen which generates the least amount of undesirable affects the highest quality ranking and the screen which generates the largest amount of undesirable affects the lowest quality ranking, ranking the objectionability of the colorants used to produce the image spot color for one or more objectionability factors relating to image quality defects, and creating halftone screen-to-colorant assignments using ranked ordered pairing of the ranked screens and ranked colorants, pairing the screen having the highest quality ranking with the colorant having the highest objectionability, pairing the screen having the next highest quality ranking with the colorant having the next highest objectionability, and continuing the pairing in order until the screen having the lowest quality ranking is paired with the colorant having the lowest objectionability, and halftoning the image applying the halftone screens to their respective paired colorants; and a print engine printing the halftoned image using at least one of an extended gamut colorant set including more than four colorants and a colorant set including phototone colorants.

* * * * *